United States Patent
Ball et al.

(10) Patent No.: US 6,804,498 B1
(45) Date of Patent: Oct. 12, 2004

(54) METHOD FOR INFLUENCING THE LEVEL OF A RADIO-FREQUENCY TRANSMITTED SIGNAL IN A BASE STATION IN A FIXED RADIO NETWORK

(75) Inventors: Carsten Ball, München (DE); Alexander Starck, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/762,735

(22) PCT Filed: Aug. 11, 1999

(86) PCT No.: PCT/DE99/02512

§ 371 (c)(1),
(2), (4) Date: Feb. 12, 2001

(87) PCT Pub. No.: WO00/10260

PCT Pub. Date: Feb. 24, 2000

(30) Foreign Application Priority Data

Aug. 11, 1998 (DE) .......................................... 198 36 375

(51) Int. Cl.$^7$ ............................ H03C 1/62; H04B 17/00
(52) U.S. Cl. ................................. 455/115.1; 455/67.11; 455/126; 455/127.2; 455/424
(58) Field of Search ................................ 455/9, 10, 14, 455/16, 19, 67.11, 67.14, 115.1, 115.2, 115.3, 115.4, 121, 123, 126, 127.1, 127.2, 423–424, 425

(56) References Cited

U.S. PATENT DOCUMENTS 5,574,981 A * 11/1996 Ahonen .................... 455/67.14
5,590,415 A * 12/1996 Peltola et al. ............. 455/115.1
5,754,943 A * 5/1998 Arai et al. ..................... 455/14
5,774,789 A * 6/1998 van der Kaay et al. ....... 455/16
5,983,070 A * 11/1999 Georges et al. ............... 725/78
6,151,482 A * 11/2000 Eriksson ................... 455/67.11

FOREIGN PATENT DOCUMENTS

| EP | 0 558 210 A1 | 9/1993 | |
|---|---|---|---|
| EP | 0 684 707 A1 | 11/1995 | |
| EP | 0 750 405 A2 | 12/1996 | |
| JP | 03 145 341 A | * 6/1991 | ............ H04B/3/46 |

OTHER PUBLICATIONS

The Abstract of JP 03 145 341 A (Cable Loss Dectector).*

* cited by examiner

Primary Examiner—Simon Nguyen
(74) Attorney, Agent, or Firm—Bell, Boyd & Lloyd LLC

(57) ABSTRACT

A method for influencing the level of a radio-frequency transmitted signal in a base station in a fixed radio network wherein the level of the radio-frequency transmitted signal is measured, and the level difference from the measured levels is determined in a transmitting/receiving unit and in an antenna transmitting/receiving unit which is connected to the transmitting/receiving unit via a cable. The level of the transmitted signal is influenced in such a manner that the level difference which is determined is maintained approximately at a predetermined level difference so as to compensate for level fluctuations in the transmitted signal caused by different cables and environmental influences.

10 Claims, 2 Drawing Sheets

METHOD FOR INFLUENCING THE LEVEL OF A RADIO-FREQUENCY TRANSMITTED SIGNAL IN A BASE STATION IN A FIXED RADIO NETWORK

BACKGROUND OF THE INVENTION

1. Field of the Invention

The present invention relates, generally, to a method for influencing the level of a radio-frequency transmitted signal in a base station in a fixed radio network and, more particularly, to such a method wherein the level of the transmitted signal is first measured in a transmitting/receiving unit and then measured in a subsequent antenna transmitting/receiving unit such that a level difference is determined and the level is then influenced so as to approximately maintain a predetermined level difference.

2. Description of the Prior Art

In order to produce a fixed radio network, radio base stations are provided to which network termination devices are connected without wires. A network termination device represents the termination of a communications network (for example, a public or private communications network). The network termination device provides an interface (for example, an analog or digital telephone or ISDN interface) to which communications terminals (for example, analog or digital telephone terminals or ISDN communications terminals) are connected. The information to be transmitted from or to the communications terminals is transmitted via radio signals, which are formed in accordance with either the standardized DECT transmission method or the CDMA transmission method, via the radio path between the network termination devices and the radio base stations.

In a radio base station, a radio-frequency signal which is to be transmitted is formed, for example, in accordance with the CDMA transmission method. In order to avoid considerable attenuation resulting from transmission via a cable, in particular a coaxial cable, the transmitted signal is transmitted at a lower level or at a lower power via a cable to an antenna transmitting/receiving unit. The antenna transmitting/receiving unit contains a line amplifier and is connected to an antenna which transmits the radio-frequency transmitted signal as a radio signal. The antenna transmitting/receiving unit is generally fitted at the upper end of an antenna mast close to the antenna. A radio signal is received in the network termination device, and the radio-frequency received signal which is received is used to derive the transmitted information. The antenna transmitting/receiving unit also contains a low-noise amplifier for a received signal. The received signal is passed directly from the antenna, if the transmitting/receiving unit and the antenna transmitting/receiving unit are separate, or via a transmission/reception diplexer in the case of a joint transmitting/receiving antenna, to the amplifier.

The power of the transmitted radio signal or the level of the radio-frequency transmitted signal is, in this case, influenced significantly not only by the level change caused, for example in the case of CDMA transmission method, by the transmission method which is used, but also by the antenna transmitting/receiving unit and by the RF cable or line which leads to the radio base station. Depending on the nature and length of the cable which is used, the level of the radio-frequency transmitted signal may have widely differing level values. Furthermore, in widely different temperature conditions, for example direct solar radiation during the day and low nighttime temperatures, the antenna transmitting/receiving unit will amplify the radio-frequency transmitted signal to considerably different extents and, thus, will additionally influence the level of the radio signal. Furthermore, the level of the received signal at the radio base station is influenced. Particularly in the case of the CDMA transmission method, precise control of the level of the radio-frequency transmitted signal represents a major function which is used to achieve optimum reception conditions in the network termination devices and minimum interference in the further network termination devices. Since level fluctuations in the received radio signal, particularly in radio networks using the CDMA transmission method, can lead to different reception power levels in the network termination devices as will as to operation which is subject to interference, the radio signal which is received there or the radio-frequency transmitted signal in the radio base station should be at a level which is predetermined as much as possible.

An object to which the present invention is directed, therefore to refine a radio base station and the transmission path in a radio base station in such a manner that a radio signal is transmitted approximately at the intended level by the antenna, with transmission-method-dependent level changes having to be ensured.

SUMMARY OF THE INVENTION

The major aspect of the method of to the present invention ensures that the level of the transmitted signal which is passed to it is measured in the transmitting/receiving unit, and the level of the transmitted signal which is transmitted via the cable is measured in the antenna transmitting/receiving unit. The level difference between the measured levels is then determined and compared with a predetermined level difference, and the level of the transmitted signal is influenced in such a manner that the level difference which is determined is maintained approximately at the predetermined level difference. In this way, the overall gain of the arrangement formed by the transmitting/receiving unit, the cable and the antenna transmitting/receiving unit is set to a predetermined value or gain factor, and this setting is monitored and, if necessary, readjusted.

The comparison of the level differences and the influencing of the transmitted signal can be carried out in the transmitting/receiving unit or, alternatively, in the antenna transmitting/receiving unit, with the measured levels being transmitted to the transmitting/receiving unit or to the antenna transmitting/receiving unit. A major advantage of the method of the present invention is that the level of transmitted signal at the antenna is kept approximately at a value which is dependent on the transmission method, irrespective of the length and transmission characteristics—particularly, attenuation) of the cable between the transmitting/receiving unit, in which case the different transmission characteristics are caused by different cable types and by environmental influences such as severe temperature fluctuations. The transmitted signal level control according to the present invention allows optimum reception conditions to be ensured in the network termination devices.

According to one advantageous embodiment of the method of the present invention, the level of the transmitted signal which is transmitted via the cable is measured in the antenna transmitting/receiving unit before and after amplification of the radio signal, the additional measurement result is transmitted via the cable to the transmitting receiving unit. The additionally measured level is transmitted via the cable to the transmitting/receiving unit, and a further level difference between the measured levels is determined. If there is any discrepancy in the further level difference, this is included in the influence on the transmitted signal. This measure also allows different gain factors, caused by severe temperature fluctuations, of the antenna transmitting/receiving unit to be detected and to be compensated for by including the measurement result in the transmitted signal level control.

The measurements of the level of the transmitted signal are advantageously carried out continuously or at regular time intervals. Continuous measurement of the level allows detailed control of the level while, in contrast, the measurement of time intervals means a reduced dynamic load on a microprocessor which is used for the method according to the present invention. In the case of measurement at regular time intervals, there is no need for integration of the measured values, via which hectic control action is smoothed out. In the case of continuous measurement, the measured level values of the level of the transmitted signal are advantageously integrated.

The levels are measured as voltage or power levels and the level difference is determined as a power level difference, with the level being converted to a power level if the voltage level is measured.

According to a further advantageous embodiment of the method of the present invention, the transmitted signal is input, and the received signal which is received with the aid of the antenna is output in the transmitting/receiving unit with the aid of a diplexer which is connected to the cable, with the transmitted signal being passed via a controllable attenuater and an amplifier to the diplexer. The transmitted signal is output and the received signal is input in the antenna transmitting/receiving unit with the aid of a diplexer which is connected to the cable, The transmitted signal is passed via an antenna transmission amplifier and the received radio signal is passed via an antenna reception amplifier. The transmitted signal is input and the received signal is output in the antenna transmitting/receiving unit with the aid of a further diplexer which is connected to the antenna cable. The level of the transmitted signal is, in each case, measured with the aid of level meters which are arranged in both the antenna transmitting/receiving unit and in the transmitting/receiving unit, and a setting signal is calculated in the transmitting/receiving unit, with the aid of a microprocessor, in order to set the attenuater. The advantageous control of the transmitted signal level with the aid of a controllable attenuater allows level control to be achieved over a wide level range.

In an installation of the transmitting/receiving unit configuration explained above, the level of the transmitted signal is measured, and the level difference is determined in both the antenna transmitting/receiving unit and the transmitting/receiving unit, and the level difference is set with the aid of the attenuater in such a manner that a level which is dependent on the transmission method is measured in the antenna transmitting/receiving unit. This level difference which is set is kept approximately constant during continuous operation with the aid of the attenuater. Alternatively, the variable attenuater can be set to a basic setting by the measured level difference between the two transmitting/receiving units and, in the course of operation, the level difference of the transmitted signal is measured before and after amplification in the antenna transmitting/receiving unit, wherein the attenuater is set as appropriate for the level difference. This assumes that, once the transmitting/receiving unit configuration has been started up, the transmission characteristics of the cable vary less than those of the temperature-dependent antenna transmission amplifier, that is, considerably greater level fluctuations are caused by the antenna transmission amplifier. In addition, the level difference caused by the cable should be determined at relatively long time intervals, and the variable attenuater should be set as appropriate for the level difference discrepancies which are determined.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
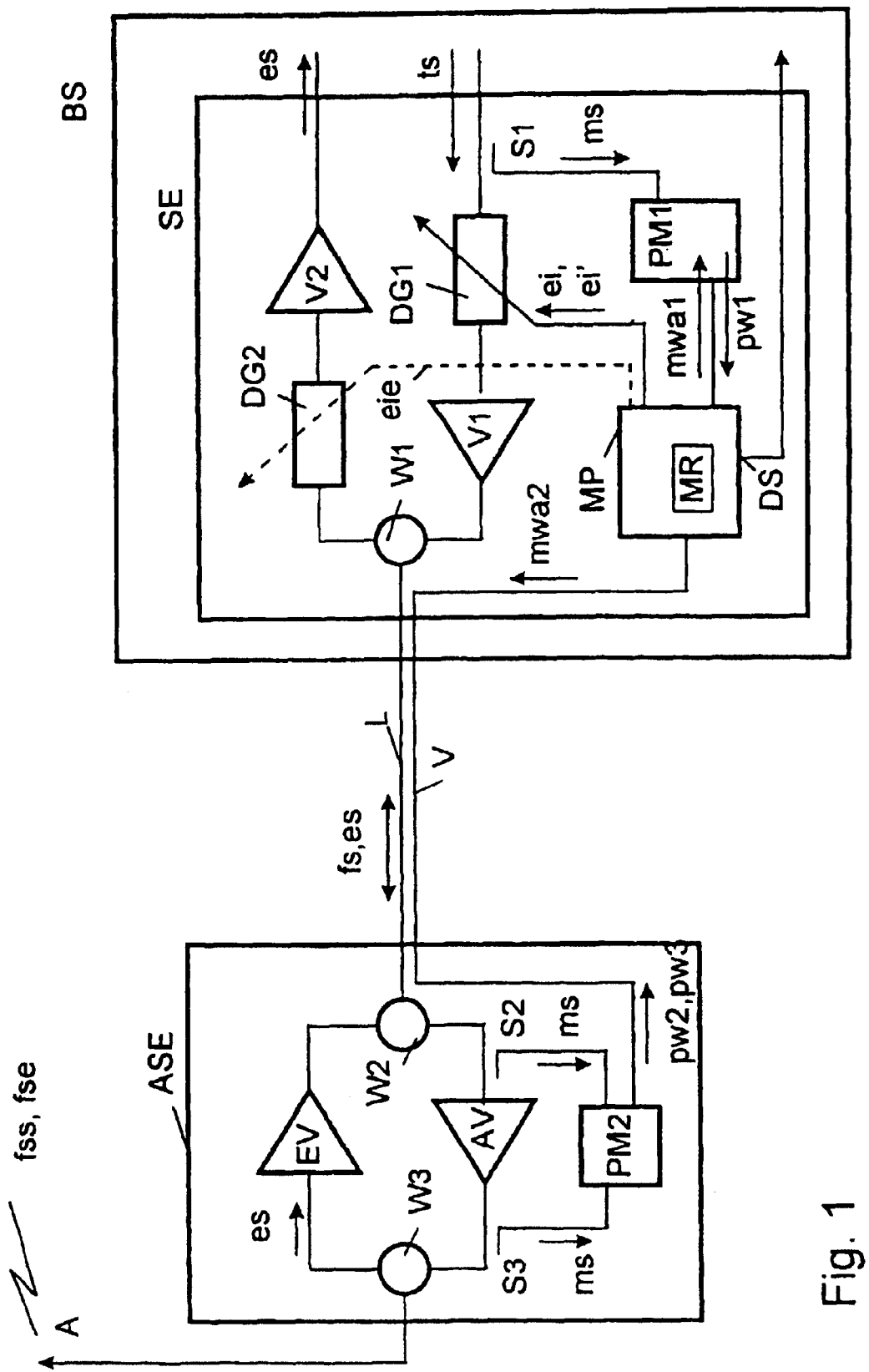
FIG. 1 shows a block diagram schematic of an arrangement for implementing the method according to the teachings of the present invention.

FIG. 1 shows a radio base station BS which is connected via a cable L to an antenna transmitting/receiving unit ASE. The cable L may be formed by widely different types of coaxial cable with widely different attenuating fittings. The antenna transmitting/receiving unit ASE is connected directly to an antenna A, in which case the antenna transmitting/receiving unit ASE and the antenna A can be arranged either a housing or separately. In addition, further connections are provided; for example, for the power supply and for interchanging information between the transmitting/receiving unit SE and the antenna transmitting/receiving unit ASE.

In the radio base station BS the cable L is passed to a transmitting/receiving unit SE, in which the cable L is connected to a first diplexer W1. For the exemplary embodiment, it is assumed that a radio-frequency transmitted signal fs, which is intended for radio transmission is formed in the radio base station BS and is transmitted, to a first, variable attenuater DG1 arranged in the transmitting/receiving unit SE. The first attenuater DG1 is, for example, in the form of a controllable Pin diode and is, furthermore, connected to a first amplifier V1 in which the radio-frequency transmitted signal fs is amplified. The radio-frequency transmitted signal fs is then input into the cable L with the aid of the first diplexer W1. The radio-frequency transmitted signal fs transmitted via the cable L is output in the antenna transmitting/receiving unit ASE with the aid of a second diplexer W2 and is passed to an antenna transmission amplifier AV. The transmitted signal fs is amplified to the required transmission power or to an intended transmission power with the aid of the antenna transmission amplifier AV, which is also referred to in the specialist field as a high power amplifier HPA. After this amplification of the radio-frequency transmitted signal fs, this signal is transmitted via a third diplexer W3 to the antenna A and is input to the connection which leads to the antenna A. The method according to the present invention relates essentially to the transmission path as described above.

However, radio signals are also received with the aid of the antenna A, as received signals es, in a radio base station BS and in the antenna transmitting/receiving unit ASE. The received signal es is output with the aid of the third diplexer W3 and, after amplification by an antenna reception amplifier EV, which is also referred to as a low noise amplifier LNA in the specialist field, is input into the cable L with the aid of the second diplexer W2. The transmitted received signal es is passed to a second variable attenuater DG2, with the aid of the first diplexer W1, in the transmitting/receiving unit SE. The received signal es is then amplified with the aid of a second amplifier V2 in such a manner that it can be transmitted to those components—not illustrated—of the radio base station BS which carry out the further processing.

According to the present invention, the level of the radio-frequency transmitted signal fs passed to it is measured in the transmitting/receiving unit SE with the aid of a first level measurement device PM1. A first sensor S1 is provided for outputting the measurement signal ms. The output measurement signal is measured in the first level measurement device PM1, is converted to digital information representing the logarithm of the measured level value pw1, and is transmitted to a microprocessor MP, which is indicated in FIG. 1 by an arrow denoted pw1. From this microprocessor MP, an additional connection V (for example, in the form of a two-core copper cable) is passed together with the cable L to the antenna transmitting/receiving unit ASE where it is connected to a second level measurement device PM2. A second sensor S2, which is arranged upstream of the antenna transmission amplifier AV, and a third sensor S3, which is arranged downstream of the antenna transmission amplifier AV, are connected to this second level measurement device PM2. A measurement signal ms is in each case output with the aid of these two sensors S2, S3, and is transmitted to the second level measurement device PM2. These measurement signals are measured analogously to the first level measurement device PM2, and information which represents digital level measured values pw2, pw3 is formed and transmitted via the connection V to the microprocessor MP, which is indicated in FIG. 1 by an arrow denoted pw2, pw3.

Figure 2:
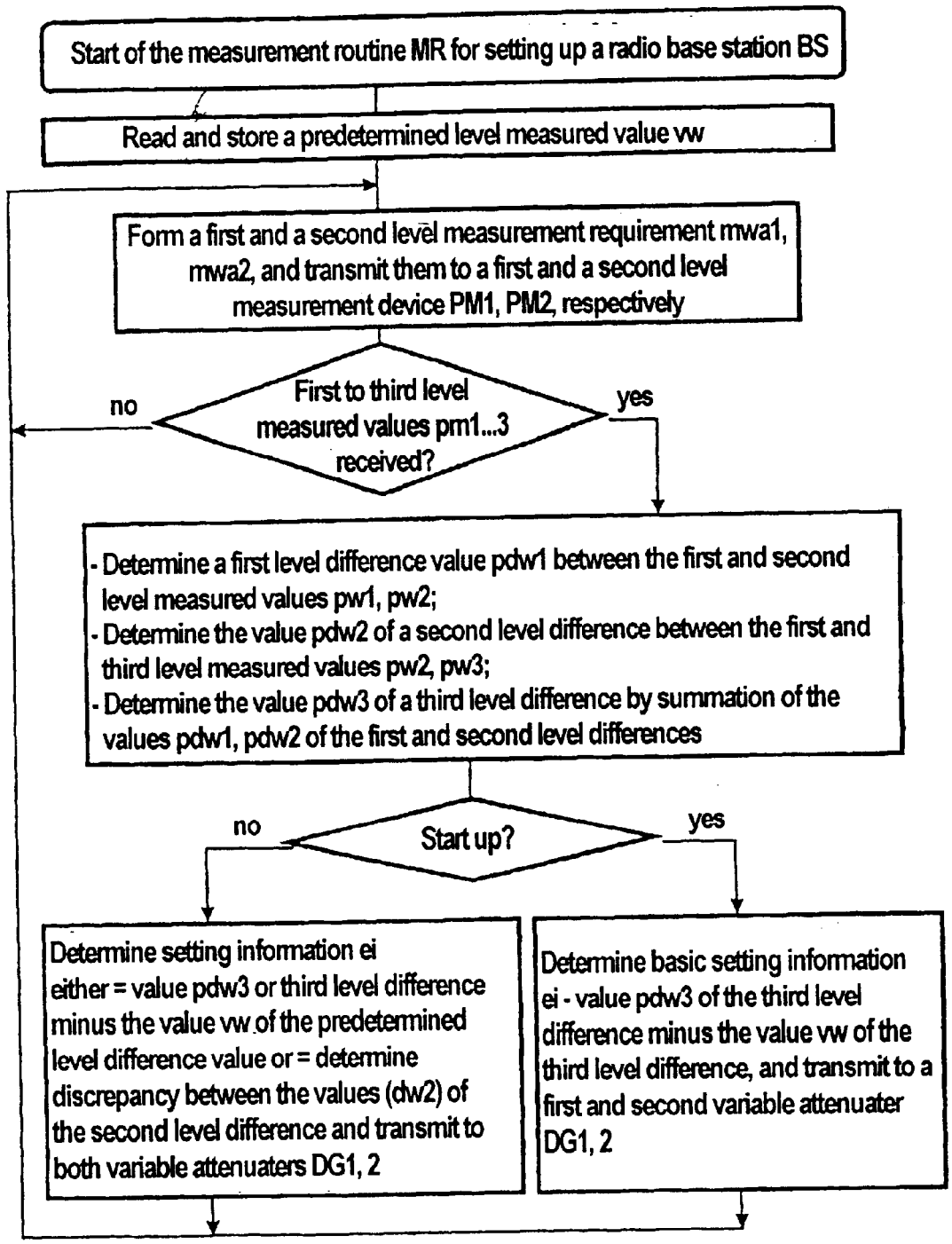
FIG. 2 shows a flow chart of the steps of the method of the present invention.

The method according to the present invention will be explained in more detail with reference to a flowchart which is illustrated in FIG. 2. FIG. 2 shows the sequence of a measurement routine MR which is carried out in the microprocessor MP. The measurement routine MR is initialized during the starting up of the radio base station BS, and a predetermined value vw is read in and stored. The reading-in process takes place, for example, via a data interface DS, which is connected to a control unit (not illustrated) of the radio base station, with the predetermined value vw being either stored in a memory in the control unit or transmitted to the control unit via an operational interface (not illustrated). The predetermined value vw indicates the level difference at which the radio-frequency transmitted signal ts which is passed via the transmitting/receiving unit SE, the cable (L) and the antenna transmitting/receiving unit ASE should be maintained. The measurement routine MR then forms a first and a second level measurement request mwa1, mwa2, and transmits this to the first and second level measurement devices PM1, PM2. A measured value mw which is present at the sensors S1 . . . 3 is then detected in the two level measurement devices PM1, PM2, and is transmitted in digital form to the microprocessor MP, as information representing first to third level measured values pw1 . . . 3.

Various level differences are determined in this microprocessor MP. The value pdw1 of a first level difference is formed by subtracting the first and second level measured values pw1, pw2. Furthermore, a value pdw2 for a second level difference is formed by subtracting the second and third level measured values pw2, pw3. The value pdw3 of a third level difference is formed by adding these two values pdw1, pdw2. The value pdw3 of this third level difference represents the overall gain factor of the radio-frequency transmitted signal fs which is passed via the transmitting/receiving unit SE, the cable (L) and the antenna transmitting/receiving unit ASE.

When the radio base station BS is started up, the value pdw3 of the third level difference is compared with the predetermined value vw, and the discrepancy is determined. This discrepancy represents the one basic setting information item ei' which is transmitted to the first and second attenuaters DG1, 2. This setting information ei is used, in particular, to set the attenuation of the first attenuater DG1 such that the value pdw3 of the third level difference and the predetermined value vw are approximately the same. This means that the previously explained overall gain factor is approximately equal to the predetermined value. This basic setting information ei' is used to set the first variable attenuater DG1 to a basic attenuation level. Since this setting is governed, in particular, by the cable characteristics, in the characteristics of the coaxial cable which is being used, the first attenuater DG1 is set to a low attenuation for cables L having high level attenuations, and is set to a high attenuation for cables L having a low level attenuation.

During operation of the radio base station BS, the setting information ei can be formed by either of the values pdw2, pdw3 of the third level difference. The setting information ei is formed as on startup if it is formed by the value pdw3 of the third level difference. If the setting information ei is formed by the value pdw2 of the second level difference, the discrepancies between the value pdw2 of the second level difference and the value pdw2 determined on startup are determined, wherein this discrepancy governs the setting information ei. This setting information ei is used essentially to compensate for different gain factors in the antenna transmission amplifier AV caused by the severe temperature fluctuations. If the setting information ei is formed by the value pdw2 of the second level difference, the value pdw1 of the first level difference is also checked (not illustrated in FIG. 2) at relatively lengthy time intervals in order to correct, for example, for any change in the attenuation of the cable L, which is likewise caused by temperature fluctuations.

Different predetermined values can be loaded in the microprocessor MP via a higher level device, for example a network management device, in a radio communications network (not illustrated) in order to influence a remotely controlled setting of the sizes of radio cells governed by the level of the transmitted signal fs. This allows radio cells to be configured and, if necessary, position changes of the radio base station BS to be avoided. In addition, the level of the radio signal at the boundaries of the radio cells can be set so as to ensure that the network termination device is operated without interference.

Furthermore, the level ratios which are determined for the transmission path and which are influenced by different cables L and gain factors also can be transmitted on the transmission path (not illustrated in FIG. 2). For this purpose, a further setting information item eie is formed, which is used to set the second attenuater DG2. The setting information ei, eie for the transmission and reception paths is, in this case, approximately the same. As a result, the setting of the second variable attenuater DG2 is approximately the same.

Although the present invention has been described with reference to specific embodiments, those of skill in the art will recognize that changes may be made thereto without departing from the spirit and scope of the invention as set forth in the hereafter appended claims.

What is claimed is:

1. A method for influencing a level of a radio-frequency transmitted signal, the method comprising the steps of:

passing the transmitted signal to a transmitting/receiving unit;

measuring the level of the transmitted signal in the transmitting/receiving unit;

transmitting the transmitted signal from the transmitting/receiving unit via a cable to an antenna transmitting/receiving unit which is connected to an antenna;

amplifying the transmitted signal in the antenna transmitting/receiving unit and measuring the level of the transmitted signal in the antenna transmitting/receiving unit both before and after amplification;

determining a first level difference between the level of the transmitted signal in the transmitting/receiving unit and the level of the transmitted signal in the antenna transmitting/receiving unit before amplification;

determining a second level difference between the level of the transmitted signal in the antenna transmitting/receiving unit before amplification and the level of the transmitted signal in the antenna transmitting/receiving unit after amplification;

using the first and second level differences to determine an overall gain;

comparing the overall gain with a predetermined level difference; and influencing the level of the transmitted signal such that the overall gain is maintained approximately at the predetermined level difference.

2. A method for influencing the level of a radio-frequency transmitted signal as claimed in claim 1, wherein the steps of comparing and influencing are carried out in one of the transmitting/receiving unit and the antenna transmitting/receiving unit, such that the measured levels of the transmitted signal are respectively transferred to the transmitting/receiving unit and the antenna transmitting/receiving unit.

3. A method for influencing the level of a radio-frequency transmitted signal as claimed in claim 1, wherein the steps of measuring the level of the transmitted signal are carried out one of continuously and at regular time intervals.

4. A method for influencing the level of a radio-frequency transmitted signal as claimed in claim 1, wherein the measured levels of the transmitted signal are integrated.

5. A method for influencing the level of a radio-frequency transmitted signal as claimed in claim 1, wherein the levels of the transmitted signal are measured as one of voltage and power levels, the level difference being determined as a power level difference with the level being converted to a power level if the voltage level is measured.

6. A method for influencing the level of a radio-frequency transmitted signal as claimed in claim 1, wherein the transmitted signal is formed using a CDMA access method.

7. A method for influencing the level of a radio-frequency transmitted signal as claimed in claim 1, the method further comprising the steps of:

inputting the transmitted signal in the transmitting/receiving unit, the transmitted signal being passed via a controllable attenuator and an amplifier to a first diplexer;

outputting a received signal, which is received with the aid of the antenna, in the transmitting/receiving unit with the aid of the first diplexer which is connected to the cable;

outputting the transmitted signal in the antenna transmitting/receiving unit, the transmitted signal being passed via an antenna transmission amplifier;

inputting the received signal in the antenna transmitting/receiving unit with the aid of a second diplexer which is connected to the cable, the received signal being passed via an antenna reception amplifier;

inputting the transmitted signal in the antenna transmitting/receiving unit;

outputting the received signal in the antenna transmitting/receiving unit with the aid of a third diplexer which is connected to the antenna;

measuring the level of the transmitted signal in both the transmitting/receiving unit and the antenna transmitting/receiving unit with the aid of first and second level meters, respectively; and calculating a setting signal in the transmitting/receiving unit with the aid of a microprocessor so as to set the attenuator, the setting signal representing the discrepancies between the determined and the predetermined level difference.

8. A method for influencing the level of a radio-frequency transmitted signal as claimed in claim 1, the method further comprising the step of:

influencing the level of the received signal by a further attenuator, the received signal being passed via a further amplifier in the transmitting/receiving unit.

9. A method for influencing the level of a radio-frequency transmitted signal as claimed in claim 1, wherein the transmitted signal is formed by a radio-frequency signal which is intended for transmission via a radio path.

10. A method for influencing the level of a radio-frequency transmitted signal as claimed in claim 1, wherein the levels of the transmitted signal which are measured in the transmitting/receiving unit and the antenna transmitting/receiving unit are respectively transmitted via at least one separate connection to the transmitting/receiving unit and the antenna transmitting/receiving unit.

* * * * *